Aug. 13, 1940.   L. A. SAFFORD   2,211,167
VALVE
Filed March 23, 1939
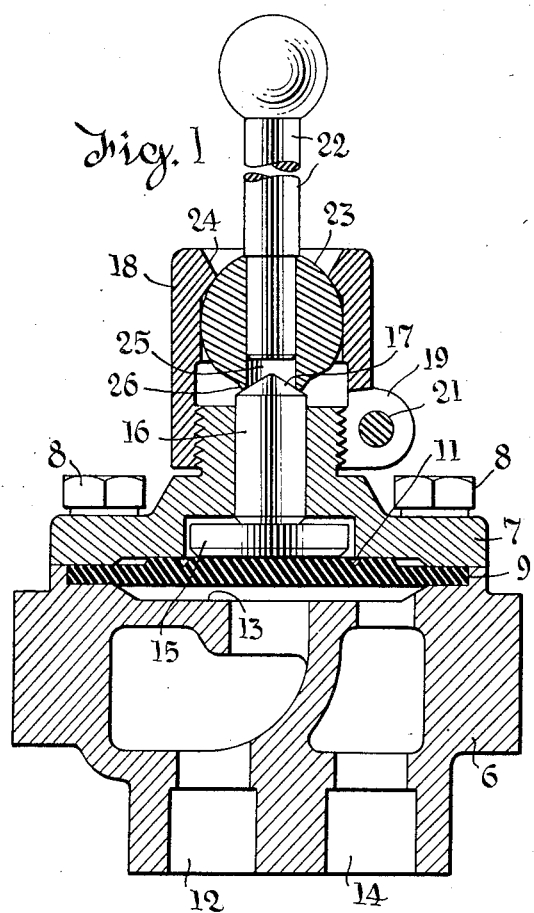
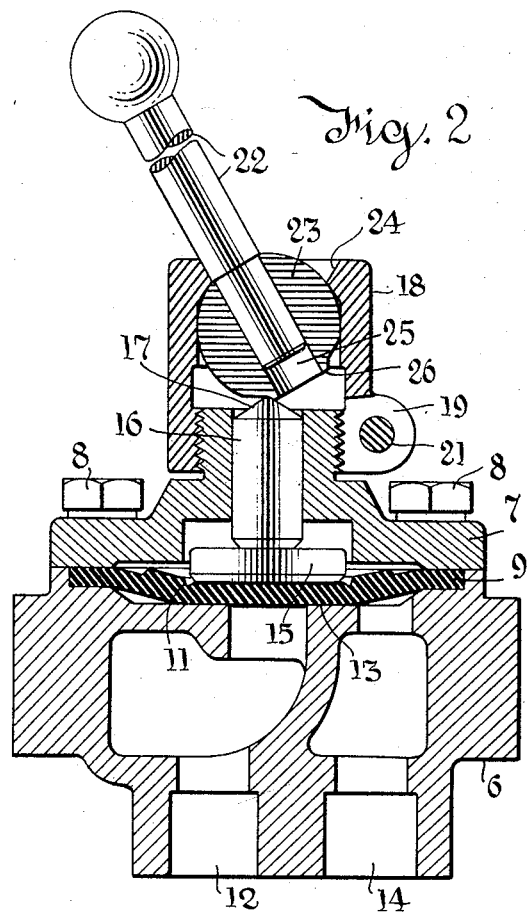
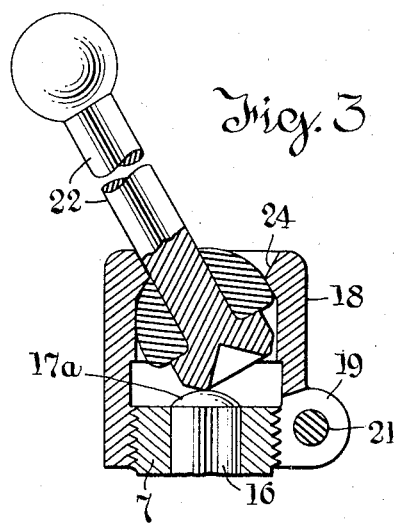
Inventor
Lewis A. Safford
By
Dodge and Sons
Attorneys Patented Aug. 13, 1940

2,211,167

UNITED STATES PATENT OFFICE 2,211,167

VALVE

Lewis A. Safford, Watertown, N. Y., assignor to The New York Air Brake Company, a corporation of New Jersey Application March 23, 1939, Serial No. 263,778

3 Claims. (Cl. 251—131)

This invention relates to valves and particularly to stop valves of the flexible diaphragm type extensively used on test racks in air brake plants.

In such test racks a battery of stop valves must be mounted close together on a panel so that they are all in reach of the test operator while he remains at his station.

Heretofore use has been made of rather complicated designs for valve actuating mechanism to secure two more or less conflicting characteristics, namely, motion of the handles all in parallel directions so that they will not interfere one with another, and the provision of adjusting means to determine the maximum pressure exerted on the valve diaphragm when the valve is closed. Reasonably accurate adjustment is necessary to ensure tight closure without mechanical injury to the valve diaphragm.

The present invention produces a simple actuator which is swiveled universally, so that it may be tilted in any direction from its neutral position, to close the valve. When so tilted the actuator is impositively retained in its tilted position. The socket in which the rocking actuator is swiveled may be adjusted to vary seating pressure, and since the socket imposes no limit on the direction of motion of the actuator, no secondary adjustment is necessary.

Use of the valve on test racks shows that it not only avoids all interference between the actuating handles of the various valves, but it permits the operator to choose any preferred direction of manipulation. This, from the standpoint of the operator, is a decided advantage.

Preferred embodiments of the invention will now be described with reference to the accompanying drawing, in which Figure 1 is an axial section through a valve in open position.

Figure 2 is a similar view of the same valve in closed position.

Figure 3 is a fragmentary view showing a modified construction, in the closed position of Figure 2.

Referring to Figures 1 and 2, 6 represents the main portion of the valve body and 7 represents the bonnet or cap which is releasably mounted on the valve body 6 by means of machine screws 8. Clamped between the members 6 and 7 is a combined gasket and diaphragm valve 9 which has a thickened central portion and which has, on its upper face, an annular groove indicated at 11 intended to define a zone of flexure.

The inlet connection 12 leads to the center of the seat 13 and the outlet connection 14 leads from the space below the diaphragm outside the seat 13. Overlying the central portion of the valve, within the groove 11, is a seating disk 15. When this is forced downward it clamps the central portion of the valve diaphragm 9 against the seat 13. It is important to observe that the valve diaphragm is not only flexible but resilient, being formed preferably of a rubber compound.

Guided in the bonnet 7 for axial movement is a valve shifting stem 16. This abuts at its lower end upon the center of the disk 15 and has at its upper end a conical configuration indicated at 17. Threaded on the upper portion of the bonnet 7 is a socket member 18 which is split as indicated at 19, so that it may be clamped by tightening a bolt 21 to lock the socket in adjusted positions on the bonnet 7.

A valve actuating handle 22 has a spherical head 23 which is swiveled in the socket 18 for universal tilting motion to a limited extent. The extent of tilting is limited by collision of the handle 22 with the shoulder 24. The head 23 is provided on its lower face, in alinement with the handle 22, with a circular socket 25. The margin of this socket is defined by an outstanding rim 26. Consequently, if the handle 22 be tilted in any direction, the stem 16 is cammed downward, rides past the rim 26, and enters behind the rim as indicated in Figure 2.

In the position of Figure 2 the stem 16 not only holds the valve closed but also impositively retains the head 23 and handle 22 in the tilted position shown. In the performance of this function, the yielding characteristic of the valve 9 is an important factor, because it makes possible a slight compression of the valve 9 after it has sealed, so that when the tip of the conical portion 17 rides past the rim 26 and engages behind it, the valve will remain tightly sealed.

In most cases a conical portion 17 on the stem 16 is preferred because it gives a sharper detent action, but this is accompanied by rather sharper and harsher closing action on the valve. Where gradual closure is desired, it can be had without sacrifice of detent action, by using a rounded or approximately spherical end 17a as indicated in Figure 3.

In the past, various schemes involving tilting handles have been used in other types of valve, but so far as applicant is advised, none of these has been used with a yielding diaphragm valve or has involved the detent action which holds the handle in its tilted position. This action is vital in the field of use for which the present invention is designed.

The importance of the invention in the test rack art arises from the facts, first, that no matter how closely the valves are spaced, the handles can be tilted without interference, the direction of tilting being left to the choice of the operator; second, that the degree of sealing pressure can be adjusted by turning the socket member 18 so that it is screwed up or down on the bonnet 7 with consequent adjustment of the sealing pressure; and finally, since the tilting motion of the handle is universal, this adjustment entails no secondary adjustment to correct the direction of motion of the valve actuating handle.

What is claimed is:

1. The combination of a valve body; a yielding valve mounted therein; means biasing said valve in an opening direction; a stem member guided in said body and shiftable to force said valve closed; a guide socket mounted on said body; and a valve actuator comprising a handle formed with a head swiveled in said socket and having universal tilting motion of limited extent, said head being formed with a recess bounded by an outstanding rim, the parts being so formed and arranged that the stem member enters said recess to permit the valve to open when the actuator is in a median neutral position and rides over and behind the rim as the actuator is tilted from said position, to shift and hold the valve closed and simultaneously to retain the head in its tilted valve closing position.

2. The combination defined in claim 1 in which the portion of the stem member which coacts with the head is rounded to afford gradual valve closure as the head is tilted.

3. The combination defined in claim 1, in which the guide socket is so mounted on said body that it may be adjusted in the general direction of motion of said stem member whereby the sealing pressure on the valve when the latter is closed may be adjusted without imposing limits on the tilting motion of the valve actuator.

LEWIS A. SAFFORD.